US 6,732,247 B2

(12) United States Patent
Berg et al.

(10) Patent No.: US 6,732,247 B2
(45) Date of Patent: May 4, 2004

(54) MULTI-PORTED MEMORY HAVING PIPELINED DATA BANKS

(75) Inventors: Stefan G. Berg, Seattle, WA (US); Donglok Kim, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 180 days.

(21) Appl. No.: 09/764,250

(22) Filed: Jan. 17, 2001

(65) Prior Publication Data

US 2002/0095555 A1 Jul. 18, 2002

(51) Int. Cl.[7] .............................................. G06F 13/00
(52) U.S. Cl. ............................ 711/169; 711/149; 711/5
(58) Field of Search ................................. 711/147, 149, 711/155, 168, 169, 148, 5, 167; 713/400

(56) References Cited

U.S. PATENT DOCUMENTS

| | | | | |
|---|---|---|---|---|
| 5,586,299 A | * | 12/1996 | Wakerly | 710/110 |
| 5,612,923 A | * | 3/1997 | Gibson et al. | 365/230.05 |
| 5,761,147 A | * | 6/1998 | Lindner et al. | 365/189.07 |
| 5,848,264 A | * | 12/1998 | Baird et al. | 703/28 |
| 5,956,747 A | * | 9/1999 | Wilhelm et al. | 711/140 |
| 5,987,587 A | * | 11/1999 | Meltzer | 712/10 |
| 6,128,728 A | * | 10/2000 | Dowling | 710/22 |
| 6,167,487 A | * | 12/2000 | Camacho et al. | 365/189.04 |
| 6,202,139 B1 | * | 3/2001 | Witt et al. | 365/189.05 |
| 6,212,604 B1 | * | 4/2001 | Tremblay | 711/120 |
| 6,321,318 B1 | * | 11/2001 | Baltz et al. | 711/154 |
| 6,401,176 B1 | * | 6/2002 | Fadavi-Ardekani et al. | 710/240 |
| 6,418,488 B1 | * | 7/2002 | Chilton et al. | 710/20 |
| 6,425,070 B1 | * | 7/2002 | Zou et al. | 712/35 |
| 2002/0046324 A1 | * | 4/2002 | Barroso et al. | 711/122 |

FOREIGN PATENT DOCUMENTS

GB        2246650 A   *  2/1992   ........... G06F/12/02

OTHER PUBLICATIONS

Berg et al; "Critical Review of Programmable Mediaprocessor Architectures," SPIE Proceedings, vol. 3655, pp 147–156, 1999.
McKee et al., "Smarter Memory: Improving Bandwidth for Streamed References," IEEE Computer, vol. 31, No. 7, pp. 54–63, 1993.
Patterson et al.; Computer Architecture A Quantitative Approach Morgan Kaufman Publishers, Inc., pp. 39–44, 1996.
Weste et al.; Principles of CMOS VLSI Design, A Systems Perspective Addison–Wesley Publishing Company, pp. 580–582, 1993.
Kontothanassis et al.; "Cache Performance in Vector Supercomputers," Proceedings of the Conference on Supercomputing '94; pp 255–264, Nov. 1994.
Semiconductor Industry Association, "National Technology Roadmap for Semiconductors," 1997.

* cited by examiner

*Primary Examiner*—Hong Kim
(74) *Attorney, Agent, or Firm*—Steven P. Koda

(57) ABSTRACT

Multi-ported pipelined memory is located on a processor die serving as an addressable on-chip memory for efficiently processing streaming data. The memory sustains multiple wide memory accesses per cycle, clocks synchronously with the rest of the processor, and stores a significant portion of an image. Such memory bypasses the register file directly providing data to the processor's functional units. The memory includes multiple memory banks which permit multiple memory accesses per cycle. The memory banks are connected in pipelined fashion to pipeline registers placed at regular intervals on a global bus. The memory sustains multiple transactions per cycle, at a larger memory density than that of a multi-ported static memory, such as a register file.

26 Claims, 4 Drawing Sheets

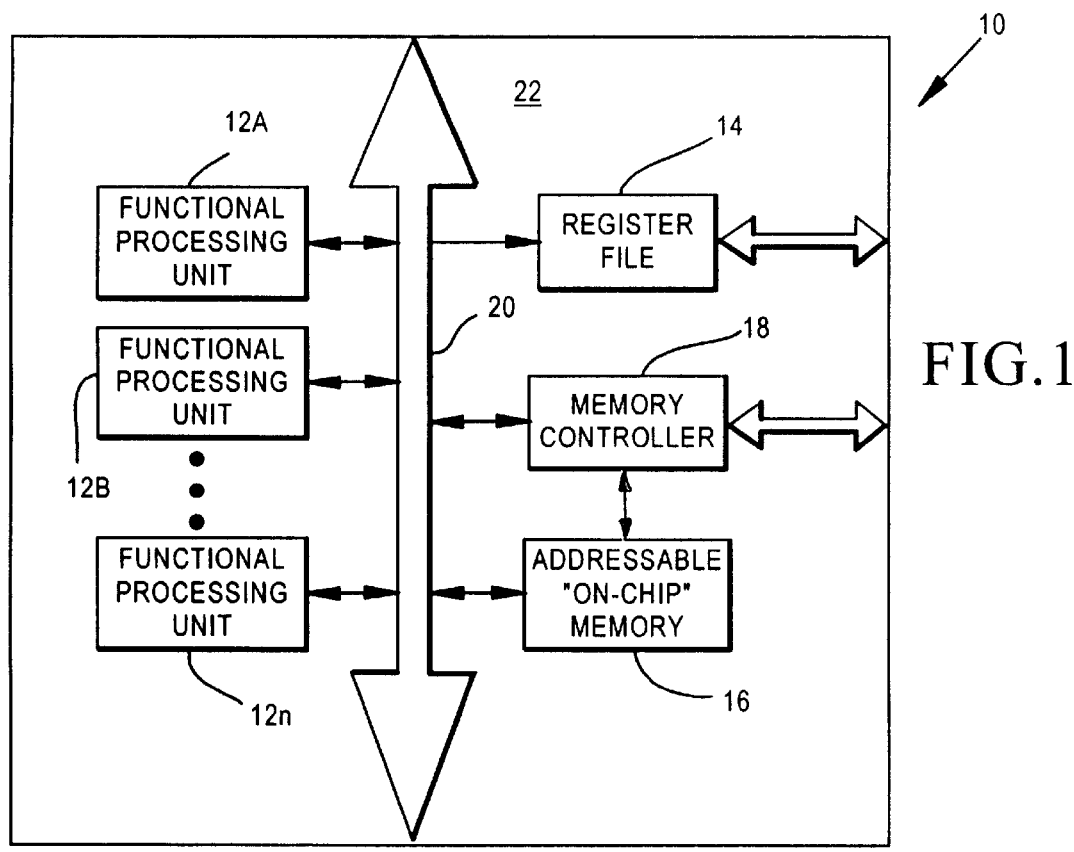
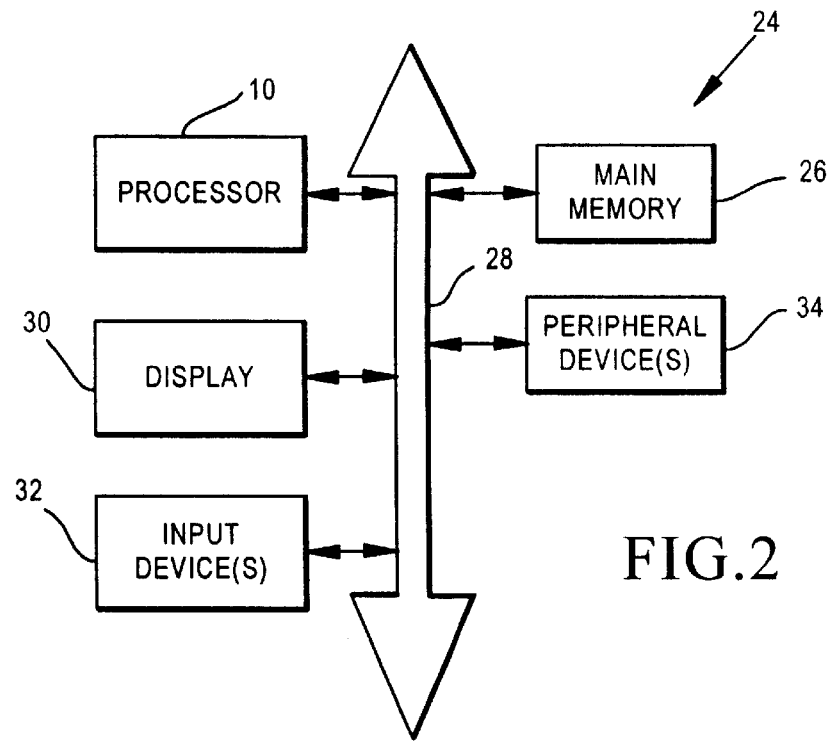

MULTI-PORTED MEMORY HAVING PIPELINED DATA BANKS

BACKGROUND OF THE INVENTION

This invention relates to memory circuits, and more particularly to addressable memory circuits located on a processor chip.

It is common for processors to dedicate a significant portion of their die area to an on-chip static memory. Such on-chip memory typically is organized as a level-1 or a level-2 cache. The on-chip cache memory serves to temporarily hold data from (and for) external main memory, and to hold intermediate data used in processing. As the throughput of processors has increased, outpacing the speeds of off-chip memory, the on-chip cache has come to play a key role in keeping the functional processing units of the processor busy. The on-chip cache fetches data in a small block around a requested word, and attempts to keep frequently accessed data in storage, replacing less frequently accessed data. A pattern of referencing data which has high temporal locality takes advantage of the cache and enables efficient processing. On-chip cache, typically however, does not reduce access latency relative to off-chip memory when there is little spatial or temporal locality, and when the data set is significantly larger than the cache memory size. In particular for streaming data applications, such as image processing, the cache tends to replace a lot of other useful data with streaming data. Such streaming data is not likely to be accessed again within a short time. When it is re-accessed or nearby data is accessed, chances are high that the corresponding data block has already been replaced by other data. Accordingly, on-chip caches typically do not yield the same benefits for streaming data applications as for other applications.

Mediaprocessors have been developed to handle streaming data applications more efficiently. Some mediaprocessors such as the Texas Instruments TMS320C80 and the TMS320C6x replace the on-chip cache with a similar-sized addressable on-chip memory. The TM-1000 of Philips Trimedia family and the MAP1000 developed by Equator Technologies, Inc. and Hitachi Ltd. have lockable on-chip caches that can be reconfigured into addressable memory. Addressable on-chip memory is more desirable for streaming data, such as in image processing applications.

Streaming data are often fetched from external main memory sequentially. A direct memory access ('DMA') engine does not need to be very complex to handle such access. When the addressable on-chip memory can fit an entire data structure, the memory is very effective at keeping the processor's functional units busy.

The most significant disadvantage of the on-chip addressable memory is the complexity in managing it. The programmer specifies exactly how data is to be laid out in the addressable on-chip memory and initiates all DMA transfers at the correct times. It is a challenge for programmers to achieve such management efficiently with current compiler technologies. Another disadvantage is that the streaming data is short-lived. Still another disadvantage is that extra registers are needed to achieve the lowest cycle time for processing the streams of data.

Accordingly, there is a need for an efficient on-chip memory scheme for handling streaming data.

SUMMARY OF THE INVENTION

According to the invention, a multi-ported pipelined memory is located on a processor die serving as an addressable on-chip memory. Such on-chip memory enables efficient processing of streaming data. Specifically, the memory sustains multiple wide memory accesses per cycle. It clocks synchronously with the rest of the processor, and it stores a significant portion of an image.

According to one aspect of the invention, the multi-ported pipelined memory is able to bypass the register file and serve as a direct data provider to the processor's functional units. When operated in such manner, multiple wide access patterns are achieved per cycle. This is desirable and advantageous for multimedia applications and multiprocessing environments. It also is desirable and advantageous when using a superscalar or a very long instruction word ('VLIW') architecture.

According to another aspect of the invention, the multi-ported pipelined memory includes multiple memory banks which permit multiple memory accesses per cycle. In a preferred embodiment the memory banks are connected in pipelined fashion to pipeline registers placed at regular intervals on a global bus. The pipelined registers allow wire lengths to be kept short and are omitted in some embodiments to reduce the number of cycles for an on-chip memory access operation. The multi-ported pipelined memory sustains multiple transactions per cycle, and at a larger memory density than that of a multi-ported static memory (e.g., a register file).

According to another aspect of the invention, the multi-ported pipelined memory performs read and write operations on a shared data bus of a read write port simultaneously, significantly reducing the number of wires allocated.

According to another aspect of the invention, a given read port is able to perform multiple memory transactions in a single access operation. In a preferred embodiment, such read port is able to perform four parallel 64-bit memory transactions in a single access operation. The transactions are returned as a single concatenated word. An advantage of such feature is that the number of accesses performed by a multimedia application (e.g., warping, histogram equalization) accessing non-consecutive memory words is reduced.

According to another aspect of the invention, one port of the multiple ports is capable of serving as a read port or a write port. A given access request initiated during any given clock cycle may be a read access request or a write access request. As the request is processed in pipelined fashion over multiple clock cycles, the ensuing access requests also may be either read access requests or write access requests. Thus, within the pipeline of the one port, both read and write operations may be implemented concurrently. In a sense the multiple transactions are overlapping in part.

These and other aspects and advantages of the invention will be better understood by reference to the following detailed description taken in conjunction with the accompanying drawings.

BRIEF DESCRIPTION OF THE DRAWINGS

FIG. 1 is a block diagram of a processor;

FIG. 2 is a block diagram of a computing system including the processor of FIG. 1;

DESCRIPTION OF SPECIFIC EMBODIMENTS

Overview

Figure 3:
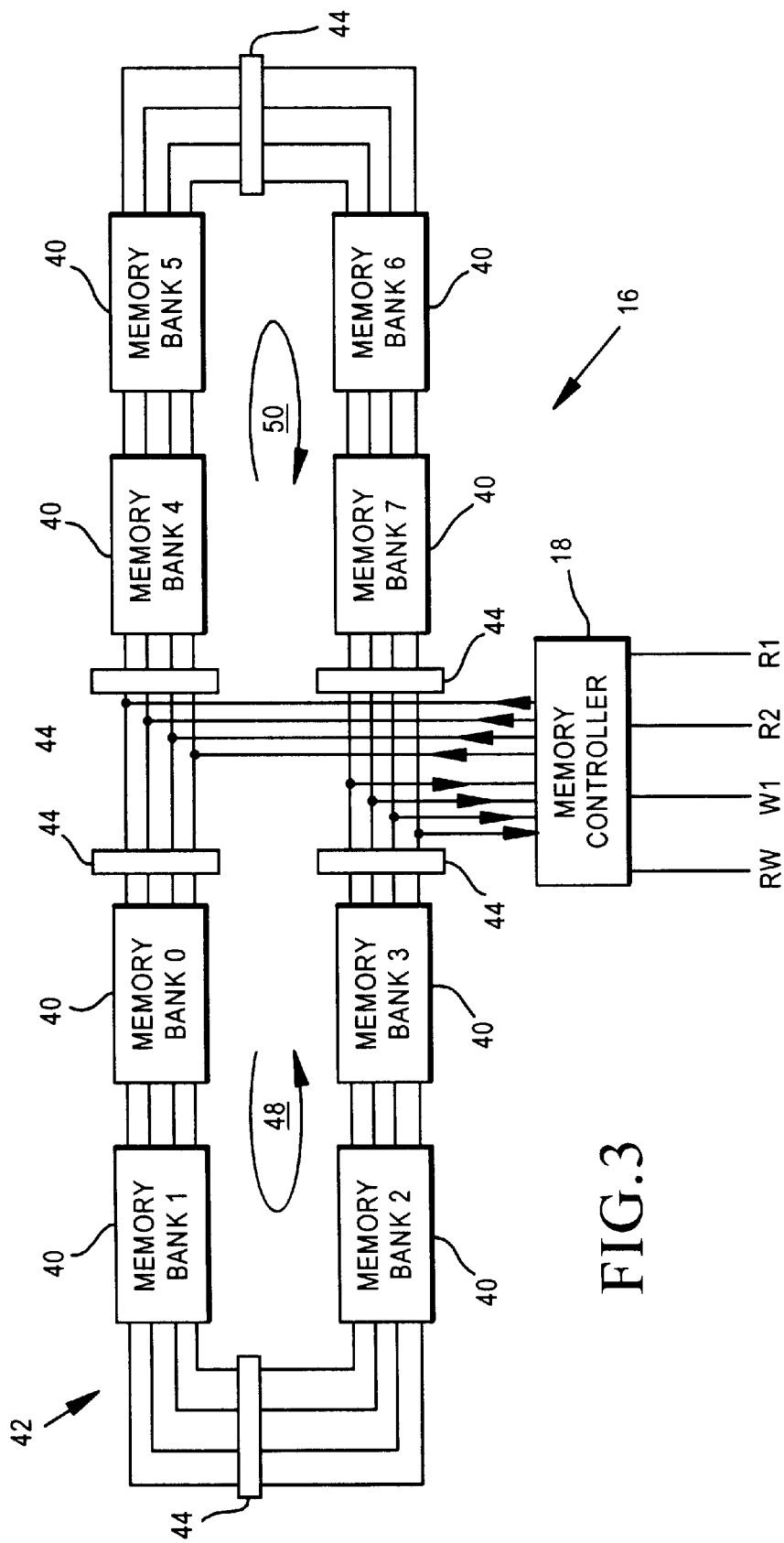
FIG. 3 is a diagram of an addressable, on-chip, multi-ported, pipelined memory of FIG. 1.

FIG. 1 shows a block diagram of a processor 10 having a plurality of functional processing units 12, a register file 14, an addressable 'on-chip' memory 16, a memory controller 18, and a bus 20 residing in a processor chip set. In some embodiments such components reside on a common die 22. A processor chip set includes multiple dies sold together as a processor, and including at least one functional processing unit, the addressable memory and connecting pathways for the functional processing unit 12 to access the memory 16. In a best mode embodiment a register file 14 also is included. Accordingly, by 'on-chip' as used in addressable on-chip memory, it is meant that such memory is either on the same die as a functional processor, or is on another die included within the processor chip set for the one or more functional processing units 12. The addressable on-chip memory 16 is a multi-ported, pipelined memory. The processor 10 is part of either a general purpose, specialized or embedded digital computing system 24 (see FIG. 2).

Data is moved between main memory 26 of the computing system and the processor via a bus among one or more system buses 28. Typically, the computing system also includes a display 30, one or more input devices 32 (e.g., key entry device, pointing/clicking device) and one or more peripheral devices 34, such as a non-volatile storage device such as a hard disk drive, and a transportable storage media drive which reads transportable storage media. Other miscellaneous peripheral devices such as a floppy disk drive, CD-ROM drive, zip drive, bernoulli drive or other magnetic, optical or other storage media, may be included. In addition, the computing system 24 may include (not shown) random access memory (RAM) and a communication or network interface (e.g., modem; ethernet adapter). The various components interface and exchange data and commands through one or more buses 28.

The computing system 24 receives information by entry through the key entry device, pointing/clicking device, the network interface or another input device or input port. The computing system 24 may be any of the types well known in the art, such as a mainframe computer, minicomputer, or microcomputer and may serve as a network server computer, a networked client computer or a stand alone computer. Alternatively, the computing system 24 is an embedded computer system. In a preferred embodiment the computing system 24 is adapted to handle data streaming applications such as image processing and video processing applications.

Addressable On-Chip Memory

Referring to FIG. 3, the addressable on-chip memory 16 includes multiple memory banks 40 located on a memory bus 42 and interfaced to a plurality of pipeline registers 44 and the memory controller 18. The memory banks 40 are arranged among a plurality of pipelines. In the exemplary embodiment illustrate, there are two separate pipelines 48, 50. Each pipeline 48, 50 includes four memory banks 40. In a preferred embodiment pipeline registers 44 are present at regular intervals on the bus. The pipeline registers 44 allow wire lengths to be kept short, but consume clock cycles for moving data through the pipeline stages.

In one embodiment the memory 16 is organized as eight memory banks 40 of single-ported static memory rated at the processor's full clock frequency (e.g., capable of single-cycle accesses). Although the number and capacity of memory banks may vary, an exemplary memory bank 40 for a mediaprocessor contains 2048 words with a word having 256 bits. The total size of such addressable on-chip memory is 512 kbytes. In a preferred embodiment, the multiple ports allow multiple read and/or write transactions. For a four port memory 16 as illustrated in FIG. 3, two ports are dedicated for read accesses (R1 and R2), one port is dedicated for a write access (W1), and the fourth port can perform a read and write access (RW), simultaneously.

To reduce memory latency in a four port embodiment, two separate pipelines 48, 50 are implemented. In an embodiment with additional ports, additional pipelines are used to mitigate against latency impacts. In the embodiment illustrated, memory banks 0, 1, 2, and 3 form the first pipeline 48, while memory banks 4, 5, 6, and 7 form the second pipeline 50. With these two pipelines, memory accesses traverse one-half the pipelines stages (four instead of eight).

In some embodiments there is a pipeline register 44 located on each side of each memory bank 40 on each pipeline. An additional latency-reduction technique is to omit pipeline registers between memory banks 0 and 1, memory banks 2 and 3, memory banks 4 and 5, and memory banks 6 and 7, as illustrated. Although memory latency is reduced, the trade-off is that the clock cycle time is increased. Depending on which one (memory latency or clock cycle time) is more important, the pipeline registers 44 are included or omitted.

Memory Controller

Figure 4:
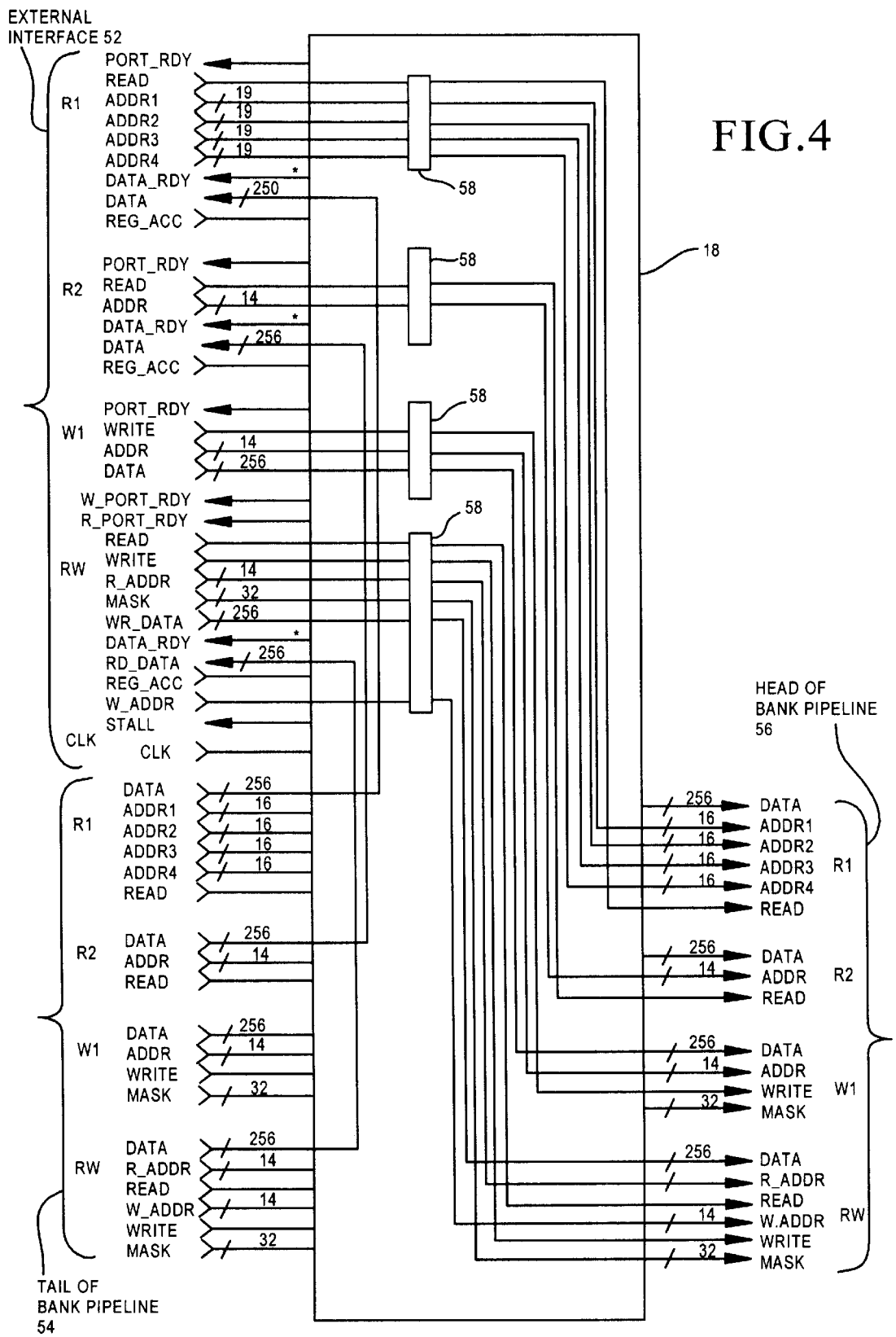
FIG. 4 is a schematic diagram of a memory controller for the memory of FIG. 3.

Referring to FIG. 4, the memory controller 18 includes an external interface 52, a tail of bank pipeline interface 54 and a head of bank pipeline interface 56, along with control registers 58. The external interface 52 communicates with main memory 26 and the functional processing units 12. The tail of bank pipeline communicates with pipelines 48, 50 (see FIG. 3). The head of bank pipeline interface 56 also communicates with the pipeline 48, 50, but at the opposite end of the respective pipeline.

External Interface

The external interface 52 connects directly to the control registers 58, and includes four ports (R1, R2, W1, RW), and clock input. In one embodiment there are two read ports (R1 and R2). The read ports are used to read data from the pipelined memory banks 40. The process of requesting data (providing an address) and reading data are separate actions. Since the time separation of these two actions are not known ahead of time, two separate ready signals (PORT_RDY and DATA_RDY) are present.

A data request is made by providing an address on the address inputs (ADDR or ADDR1 through ADDR4) and asserting the read signal (READ). The request is processed at each rising clock edge.

In one embodiment the R1 port is featured with four separate address lines instead of a single one. This is the differentiating aspect between the R1 and R2 ports. For the R2 port, a single 14-bit address is supplied that references a 256-bit word. For the R1 port, four separate 19-bit addresses are supplied, each referencing a 64-bit word of the pipelined memory respectively. The four separate 64-bit words referenced by the four addresses from the R1 port are concatenated together and returned on the 256-bit data bus. The data from ADDR1 is assigned to the lowest 64-bit block and the data from ADDR4 is assigned to the highest 64-bit block. The memory controller automatically resolves conflicts. This accounts for 16 bits in the R1 address. The least-significant 3 bits of the address are multiplied by eight and used as the right-shift amount for each 64-bit word individually (zeros are inserted on the left). The shifting is embedded in the memory controller and is useful for aligning 8-bit, 16-bit, or 32-bit data.

Read ports can be busy due to conflicts which are signaled by the port ready output (PORT_RDY). No further data request is be accepted when the port ready signal is deasserted. Also, each read port has a 256-bit data output (DATA) and a data ready signal (DATA_RDY). The data ready signal always precedes the data by one clock cycle. If the data ready signal is asserted at the rising clock edge of cycle i, then valid data can be latched at the rising clock edge of cycle i+1.

The read ports process requests and return data in-order. For example, if a series of data requests to address a1, a2, and a3 are made, then some time later, the data that was stored in the pipelined memory at addresses a1, a2, and a3 will be returned in the same order.

The W1 port of the external interface, also referred to herein as the write port, is used for storing data in the pipelined memory banks 40. Performing a write operation is similar to performing a data request on the read ports, but the write operation provides the data to be written in addition to the address. Therefore, the write port has three inputs, the write signal (WRITE), a 14-bit address input (ADDR), and a 256-bit data input (DATA). There is also a port ready signal (PORT_RDY) that is asserted when the transaction is finished.

The RW port of the external interface 52 combines a read and write functionality together and is referred to as the read-write port. A read operation and a write operation can be performed simultaneously. When a read operation is performed, the behavior is identical to the regular read port. For a read operation, the read signal (READ) and address (R_ADDR) inputs are used. In addition, the port ready (R_PORT_RDY), data ready (DATA_RDY), and data (RD_DATA) outputs are used. For a write operation, the write signal (WRITE), mask (MASK), address (W_ADDR), and data (WR_DATA) inputs and the port ready (W_PORT_RDY) output are used. A write operation behaves exactly like it does on the write port with the addition of a signal mask. The mask input is a 32-bit value that is valid together with the write signal, address, and data inputs during a write operation. Each bit in the mask, corresponds to an 8-bit sub-field in the data. Each 8-bit sub-field of the data input is written while the corresponding mask bit is in the set condition. Otherwise, the previous value of the memory is retained.

The read and read-write ports each have a special register access input signal (REG_ACC). Generally this signal is left unasserted during normal operations. When REG_ACC is asserted, the stall output signal (STALL) is be asserted if the read access on the particular port cannot be completed within six cycles. A six-cycle delay is the minimum delay and the read access will take longer than six cycles when there are conflicts. For any additional delay beyond six cycles, the stall output signal remains asserted until the data is ready (indicated by DATA_RDY). The STALL signal is used to issue a stall request to a functional unit when handling load/store accesses.

Internal Operation of Memory Controller and Pipelines

The pipelines 48, 50 connect the memory banks 40 in a pipelined arrangement. A transaction is injected into one of the two pipeline buses 48, 50 which then traverses the pipeline from head to tail. During this traversal, the transaction visits multiple banks. Each bank visited looks at the transaction address. A memory bank 40 acts on a transaction when the bank address specified by the transaction matches to its address. For write transactions, the transaction traverse the appropriate pipeline from head to tail. During this process, one of the banks will perform the write operation.

On read transactions the addressed memory bank 40 places data onto the appropriate pipeline bus 48/50. The data moves along the pipeline eventually arriving at the tail of the pipeline, where the memory controller 18 immediately feeds it to the data line of the external interface 52. In one embodiment the data from read transactions is delayed by two clock cycles relative to the remainder of read transactions. This is because of the inherent delay in the pipelined memory banks. This two-cycle separation between address and data may cause bus conflicts on the RW pipelined bus when read transactions are closely followed by write transactions. The memory controller 18 ensures that these conflicts are resolved.

The simplest operation for the memory controller 18 is when none of the eight addresses on the four ports of the external interface 52 conflict with each other.

When conflicts are taken into account, the operation of the memory controller 18 is more complex. A single control register 58 in the memory controller 18 divides the memory controller into two stages, called the 'accept' stage and 'issue' stage. The 'accept' stage determines if a transaction from the external interface 52 should be latched onto the control registers 58. This decision is made for each port of the external interface 52 independently. If a transaction is not latched onto the corresponding control register 58, then such condition is signaled to the requester (e.g., the load/store unit or DMA controller) by deasserting the appropriate PORT_RDY signal. The 'issue' stage determines if a transaction stored in a control register 58 should be sent out to the head of the bank pipeline interface. Once injected into the appropriate pipeline 48 or 50, a transaction continues until completion. Progress in the 'accept' and 'issue' stages is tightly coupled, because if a transaction cannot issue, then a new transaction is not to be accepted. A given control register 58 stores only a single transaction for each port of the external interface 52. There is a third stage called the 'writeback' stage that is responsible for returning data from the tail of the bank pipeline interface 54 onto the external interface 52. It is only involved with read transactions and operates synchronously with no delays.

Accept Stage

The accept stage consists of four independent controllers, one for each port. A new transaction can be accepted when the corresponding control register does not contain a transaction, or the transaction in the corresponding control register is to be issued on the next clock cycle.

A read transaction is accepted when there is no write transaction to the same 256-bit word address currently residing in the control register of any port that will not issue on the next clock cycle. A write transaction is accepted when there is no read or write transaction to the same 256-bit word address currently residing in the control register of any port that will not issue on the next clock cycle. These two criteria are used to prevent any data dependence violations (read-after-write, write-after-read, and write-after-write). For example, a read transaction of address 'n' on port R1 of external interface 52 is not accepted if there is currently a write transaction for address 'n' waiting in the control register 58 of port W1 of the external interface 52. If the read transaction were to be accepted, the memory controller 18 could undesirably issue the read transaction before the write transaction and violate read-after-write dependency. The 'accept' and 'issue' stages allow time between different transactions to detect whether a transaction occurs before or after another transaction.

Issue Stage

The 'issue' stage is responsible for resolving bank conflicts. (Note that the 'accept' stage has nothing to do with resolving bank conflicts, but is responsible for checking data dependencies). Up to eight different transactions are issued during the 'issue' stage, because the R1 port consists of four subword transactions and the RW port of distinct read and write transactions. When there is no conflict, all eight transactions are issued simultaneously. When there are conflicts, then precedence is given to those transactions that have their REG_ACC input signal asserted, i.e., the memory accesses from/to the registers are issued first. Subsequent conflicts are resolved on a round-robin basis across the four ports. Those transactions that are not allowed to issue remain in the control registers.

There are four sources of conflicts. Read bank conflicts, write bank conflicts, multi-read bank conflicts, and RW bus conflicts. A read bank conflict exists when the issue stage issues a read from an address 'a' on bank 'b' at cycle 'c' and attempts to issue another read from an address different than 'a' on bank 'b' at cycle 'c', or attempts to issue a write to any address on bank 'b' at cycle 'c'. A write bank conflict exists when the issue stage issues a write to an address 'a on bank 'b' at cycle 'c' and attempts to issue a read from any address on bank 'b' at cycle 'c', or attempts to issue another write to any address on bank 'b' at cycle 'c'. A multi-read bank conflict exists when the issue stage issues a 64-bit R1 subword read from a 256-bit word address 'a' on bank 'b' at cycle 'c' and attempts to issue another 64-bit R1 subword read from a word address different than 'a' on bank 'b' at cycle 'c'. In this context, each 256-bit word address has four 64-bit subword addresses that map to it. A RW bus conflict exists when the issue stage issues a RW read from an address a on bank 'b1' at cycle 'c' and attempts to issue a RW write to any address on bank 'b2>b1' at cycle 'c+2' where 'b1' and 'b2' are in the same side of the two pipeline buses.

RW bus conflicts exist because the data bus is shared between read and write transactions on the RW port. They exist on transactions spread across time, because a read transaction occupies the data bus two cycles after it is issued (due to the latency present in the memory banks). Detecting an RW bus conflict is the enabling feature for supporting simultaneous read and write transactions on the RW bus. Simultaneous read and write transactions are possible as long as the read transaction is performed on a bank located after the bank targeted by the write transactions or when read and write transactions are performed on different pipeline buses.

Operation Summary

To perform a memory read access or a memory write access to the on chip memory 16, an address is injected to the start of a pipeline 48/50 that is coupled to the port handling the access. For a read operation, the data is presented on the accessed port at the end of the pipeline several cycles later. Preferably, each pipeline is laid out in such a way that the start of the pipelines (banks 0 and 4) and the end of the pipelines (banks 3 and 7) are located physically close to the memory controller 18. This is referred to herein as a circular topology. By using the circular topology the pipeline registers 44 reduce wire delays when performing memory reads, relative to access times for a straight topology with long wires between the memory controller 18 and the end of the pipelines.

In the four port embodiment, the pipelined bus 42 carries up to eight memory transactions simultaneously via R1, R2, W1, and RW ports. To the functional processing units 12 the on-chip addressable memory 16 has four independent ports which can be accessed synchronously with the processor clock. Each memory access references a 256-bit word, making the total width of the pipelined bus 1213 bits when the address (120 bits) and control wires (69 bits) are included.

The memory controller 18 detects memory bank 40 conflicts and ensures that the pipelined bus 42 of pipelines 48, 50 do not carry a transaction that will result in a memory bank conflict in any of the memory banks. For the four port embodiment having eight memory banks and six pipeline registers among two pipelines of three stages each, the minimum delay for a memory read is six cycles. One cycle is used for the synchronous interface, three cycles are used for the three pipeline stages, and another two cycles are for the memory access in the target memory bank. When a potential bank conflict is detected due to multiple memory accesses to one memory bank, the memory controller 18 lets one of the memory accesses proceed and schedules the other for a later time. Thus the access latency may be longer in case of a memory bank conflict.

In a preferred embodiment one of the read access ports (e.g., R1) has four address lines (instead of just one), each with an embedded 3-bit right-shift amount. For example, the 256-bit data output of the R1 port is broken into four 64-bit sub-words, each of which can be addressed independently. Each subword is right-shifted by the number of bytes specified in the 3-bit shift field for simultaneous fetching of multiple small data elements from the pipelined memory. This is beneficial, improving the performance of some multimedia algorithms, e.g., multiple table lookup operations can be performed via a single port.

In a preferred embodiment one of the access ports is a read write access port. The RW port has the capability of performing simultaneous read and write operations. This is made possible by using separate address buses for read and write transactions while sharing the data bus. This is less costly than using two separate ports. Specifically, using two separate ports increases the required bus width. Increasing bus width is costly and disadvantageous.

Figure 5:
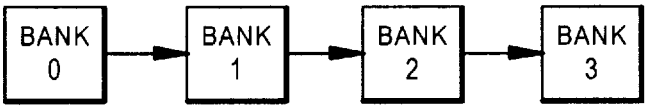
FIG. 5 is a timing diagram for a read-write port of the memory of FIG. 3.

Referring to FIG. 5, a timing diagram is presented to demonstrate how the data bus is shared. At time T1, two transactions are performed on the RW port: a read of memory bank 2 and a write to memory bank 3. The memory banks are assumed to be two pipeline stages deep. As a result, there are no conflicts at time T4 on the data bus of bank 3. The data of the read access to bank 2 does not appear on the pipeline stage of bank 3 until time T6. The read access also does not conflict with the write transaction to bank 1 at time T3. Even though both transactions occupy the same diagonal, they occur at different times. No conflict occurs because the write issued at time T3 is performed on an earlier stage than the read transaction issued at time T1. Conflicts occur only when a read transaction to a memory bank i is followed two cycles later to a write transaction to memory bank i+1 or a later memory bank. An example of a conflict also is illustrated in FIG. 5, as marked by the two circles 54, 56. The conflict is shown where a segment of the data bus is simultaneously occupied by two transactions. Conflicts such as this are resolved by the memory controller 18 which issues the write transaction one cycle later.

Meritorious and Advantageous Effects

The multi-ported pipelined on-chip memory enables efficient processing of streaming data. Specifically, the memory sustains multiple wide memory accesses per cycle. This is desirable and advantageous for multimedia applications and multiprocessing environments. It also is desirable and advantageous when using a superscalar or a very long instruction word ('VLIW') architecture. By performing multiple memory transactions in a single access operation, the number of accesses performed by a multimedia application (e.g., warping, histogram equalization) accessing non-consecutive memory words is reduced.

Other advantages are that the proposed multi-ported pipelined memory clocks synchronously with the rest of the processor, and has the capacity to store a significant portion of an image, achieving better memory density than traditional memory architectures.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A processor comprising:
   a plurality of functional processing units;
   a multi-ported memory having a plurality of ports and a plurality of memory banks, the plurality of memory banks connected in pipelined fashion to achieve pipelined address lines and pipelined data lines; and
   a bus which couples the multi-ported memory to the plurality of functional processing units, the bus being coupled to the plurality of ports of the multi-port memory to allow parallel access to multiple memory banks of the multi-ported memory during a first clock cycle, wherein the plurality of functional processing units, the multi-ported memory and the bus are packaged within a processor chip set, the processor chip set including at least one die; wherein during a second clock cycle a given port of the plurality of ports carries a plurality of data, each one of said plurality of data having an address corresponding to a unique one of said plurality of memory banks.

2. The processor of claim 1, further comprising
   a register file physically distinct from the multi-ported memory, wherein the bus couples the register file to the plurality of functional processing units.

3. The processor of claim 1, wherein a first port of the plurality of ports is a read write port and the plurality of memory banks are arranged in a pipeline for moving data relative to the read write port, wherein data from both a read access and a write access are capable of residing in the pipeline at the same time.

4. The processor of claim 1, in which each one of the plurality of ports is capable of handling a memory transaction either one of concurrently or overlapping with a memory transaction on each of the other ports of the plurality of ports.

5. The processor of claim 4, wherein the plurality of ports comprises four ports, wherein two ports are dedicated to handling a read access, a third port is dedicated to handling a write access, and a fourth port is able to handle in any given cycle either one of a write access or a read access.

6. The processor of claim 1, wherein the multi-ported memory comprises the plurality of memory banks, a memory controller, and a plurality of pipeline registers, wherein the memory bank pipeline has multiple stages, one stage comprising a first memory bank of the plurality of memory banks, another stage formed by a second memory bank of the plurality of memory banks, yet another stage formed by a pipeline register of the plurality of pipeline registers.

7. The processor of claim 6, wherein each one of the plurality of memory banks is coupled to a corresponding one of the plurality of pipelined registers.

8. The processor of claim 6, wherein for each one of the pipelined registers there is one of the plurality of memory banks coupled to said one of the plurality of pipelined registers.

9. The processor of claim 8, wherein there are less memory banks among the plurality of memory banks than pipelined registers among the plurality of pipelined registers.

10. The processor of claim 6, wherein the memory bank pipeline is a first memory bank pipeline, and wherein the plurality of memory banks are connected into a plurality of memory bank pipelines.

11. The processor of claim 6, in which the memory controller is for detecting potential memory bank conflicts and for ensuring that the pipeline does not carry a transaction that results in a memory bank conflict involving any of the plurality of memory banks.

12. The processor of claim 1, wherein the plurality of functional processing units, the multi-ported memory and the bus reside on a common die.

13. A processor comprising:
    a plurality of functional processing units;
    a register file accessible by the plurality of functional processing units;
    a multi-ported memory distinct from the register file, the multi-ported memory including a plurality of ports, a plurality of memory banks connected into a plurality of pipelines of memory banks to achieve pipelined address lines and pipelined data lines, the multi-ported memory further including a plurality of access ports and a plurality of pipeline registers coupled to the plurality of pipelines, each pipeline being accessible through at least one of the plurality of access ports, each pipeline including a plurality of memory banks and at least one pipeline register;
    a memory controller for controlling access to the multi-ported memory; and
    a bus which couples the multi-ported memory to the plurality of functional processing units, the bus being coupled to the plurality of ports of the multi-port memory to allow parallel access to multiple memory banks of the multi-ported memory during a first clock cycle, wherein the plurality of functional processing units, the multi-ported memory and the bus are packaged within a processor chip set, the processor chip set including at least one die; wherein during a second clock cycle a given port of the plurality of ports carries a plurality of data, each one of said plurality of data having an address corresponding to a unique one of said plurality of memory banks.

14. The processor of claim 13, wherein a first port of the plurality of access ports is a read write port, wherein data from both a read access and a write access are capable of residing at the same time in a first pipeline coupled to the read write port, the first pipeline being one pipeline among the plurality of pipelines.

15. The processor of claim 13, in which each one of the plurality of access ports is capable of handling a memory transaction either one of concurrently or overlapping with a memory transaction on each of the other ports of the plurality of ports.

16. The processor of claim 15, wherein the plurality of access ports comprises a first port dedicated to handling a read access, a second port is dedicated to handling a write access, and a third port able to accept in any given cycle either one of a write access or a read access.

17. The processor of claim 13, wherein for each one of the pipeline registers there is one of the plurality of memory banks coupled to said one of the plurality of pipelined registers.

18. The processor of claim 17, wherein there are less memory banks among the plurality of memory banks than pipelined registers among the plurality of pipelined registers.

19. The processor of claim 13, in which the memory controller is for detecting potential memory bank conflicts and for ensuring that the pipelines do not carry a transaction that results in a memory bank conflict involving any of the plurality of memory banks.

20. The processor of claim 13, wherein the plurality of functional processing units, the multi-ported memory and the bus reside on a common die.

21. A method for accessing an addressable on-chip memory located in a processor chip set with a plurality of functional processing units, a register file, and a bus, the processor chip set including at least one die, the addressable on-chip memory being distinct from the register file, the method comprising the steps of:

streaming data from an off-chip memory into the addressable on-chip memory;

responding to a first addressed memory access request from a first unit of the plurality of functional processing units by moving data among said first unit and said addressable on-chip memory via a first port of the addressable on-chip memory, said data moving in pipelined fashion among a plurality of addressable memory banks of said addressable on-chip memory, said on-chip memory having pipelined address lines and pipelined data lines for said plurality of addressable memory banks;

responding to a second addressed memory access request from a second unit of the plurality of functional processing units by moving data among said second unit and said addressable on-chip memory via a second port of the addressable on-chip memory, wherein parallel access to said first port and said second port occur during a first clock cycle wherein the first addressed memory access request and the second addressed memory request are either one of overlapping or concurrent; and carrying a plurality of data at a given port of the plurality of ports during a second clock cycle, wherein each one of said plurality of data have an address corresponding to a unique one of said plurality of memory banks.

22. The method of claim 21, wherein the step of responding to the first addressed memory access request comprises moving data in a pipelined fashion among a plurality of addressable memory banks of said addressable on-chip memory via a plurality of pipeline registers.

23. The method of claim 22, wherein a memory controller is packaged within the processor chip set, the method further comprising the step of:

scheduling access to the bus by the memory controller to avoid potential memory bank conflicts and ensure that the bus does not carry a transaction that results in a memory bank conflict involving any of the plurality of memory banks.

24. The method of claim 21, and wherein said data moved among said first unit and said addressable on-chip memory is moved without intermediate storage in the register file.

25. The method of claim 21, wherein the first port and the second port are the same port and wherein the first addressed memory access request is a read request and the second addressed memory request is a write request.

26. The method of claim 21, wherein the first addressed memory access request is a read request, and further comprising the step of responding to a third addressed memory access request from a third unit of the plurality of functional processing units by moving data among said third unit and said addressable on-chip memory via said first port of the addressable on-chip memory, wherein the third addressed memory access request is a write request and wherein the first addressed memory access request and the third addressed memory access request either one of overlapping or concurrent.

* * * * *